United States Patent [19]

Rivero et al.

[11] Patent Number: 5,787,365
[45] Date of Patent: Jul. 28, 1998

[54] APPARATUS FOR COMBINING CELLULAR TELEPHONE RING SIGNALS AND PSTN RING SIGNALS

[75] Inventors: Jose Louis Rivero, Boca Raton; Russell Stephen Padgett, Boynton Beach; James Christian Wulf; Robert Bedford Ferrier, both of Boca Raton, all of Fla.

[73] Assignee: International Business Machines, Armonk, N.Y.

[21] Appl. No.: 639,001

[22] Filed: Apr. 24, 1996

Related U.S. Application Data

[63] Continuation of Ser. No. 279,659, Jul. 25, 1994, abandoned.
[51] Int. Cl.[6] ............................................. H04Q 7/32
[52] U.S. Cl. ................................. 455/567; 455/556
[58] Field of Search ........................... 455/550, 562, 455/556, 403, 422, 445; 379/418, 433, 93.19, 93.28

[56] References Cited

U.S. PATENT DOCUMENTS

| | | |
|---|---|---|
| Re. 34,034 | 8/1992 | O'Sullivan . |
| 4,697,281 | 9/1987 | O'Sullivan . |
| 4,837,800 | 6/1989 | Freeburg et al. . |
| 4,837,812 | 6/1989 | Takahashi et al. .................. 379/98 |
| 4,890,315 | 12/1989 | Bendixen et al. .................. 379/59 |
| 4,972,457 | 11/1990 | O'Sullivan . |
| 4,991,197 | 2/1991 | Morris ................................. 379/58 |
| 5,127,041 | 6/1992 | O'Sullivan . |
| 5,239,580 | 8/1993 | Bruno et al. ........................ 379/443 |
| 5,257,397 | 10/1993 | Barzegar et al. . |
| 5,263,078 | 11/1993 | Takahashi et al. . |
| 5,282,238 | 1/1994 | Berland . |
| 5,408,520 | 4/1995 | Clark et al. ........................ 379/58 X |

*Primary Examiner*—Dwyane D. Bost
*Assistant Examiner*—William G. Trost
*Attorney, Agent, or Firm*—George E. Grosser

[57] ABSTRACT

A ring detection device which signals a modem in a personal communication device. A detector is connected to the cellular radio telephone for detecting an incoming telephone call. An oscillator circuit generates a ringing signal for enabling a modem in response to either the cellular telephone incoming call or a ring signal received over a directly-connected PSTN network. The modem for the personal communication device responds for providing communication over either the cellular network or directly-connected PSTN network.

4 Claims, 3 Drawing Sheets

APPARATUS FOR COMBINING CELLULAR TELEPHONE RING SIGNALS AND PSTN RING SIGNALS

The application is a continuation of application Ser. No. 08/279,659 filed on Jul. 25, 1994, now abandoned.

RELATED APPLICATIONS

This application is related to the following patent applications:

Application Ser. No. 08/310,728; Attorney Docket No. BC994-050;
Application Ser. No. 08/279,640; Attorney Docket No. BC994-096;
Application Ser. No. 08/279,644; Attorney Docket No. BC994-099;
Application Ser. No. 08/279,413; Attorney Docket No. BC994-097; and
Application Ser. No. 08/279,652; Attorney Docket No. BC994-098.

1. Field of the Invention

The present invention relates to personal communication devices which communicate over both cellular radio networks and public switched networks (PSTN). More particularly, application Ser. No. 08/146,342 the invention provides a modem which responds to incoming cellular telephone calls and incoming ringing signals received from the PSTN network.

2. Background of the Invention

Cellular radio service is now widespread throughout most of the United States. Standards have been promulgated to permit universal access to the cellular telephone network by portable telephones and mobile telephones. The communication protocol standard used in the cellular network is identified as the AMPS protocol. The service permits radio telephone communication between portable/mobile units, and the public switched telephone network (PSTN) through a radio interface.

The cellular service is now digitized and permits not only digital telephone traffic but data services as well. Thus, various services which have been implemented in the PSTN network, such as E-MAIL and facsimile, may now be implemented as well over the cellular telephone network. A radio modem is implemented at each personal communication device which provides the capability of transmitting and receiving data.

The personal communication devices are often implemented to work through a direct connection to the PSTN network, as well as over the cellular radio network. These devices include an RJ11 jack which connects directly to the PSTN network where available. The problem of having the personal communication device respond not only to signalling from the cellular radio network, but also the incompatible signalling from the PSTN network needs to be addressed. Specifically, the modem of the personal communication device requires that a ringing signal be detected in order to initialize the modem for data reception over the cellular radio network, as well as the directly-connected PSTN network. The fact that the cellular radio produces a ringing signal in a different format from the ringing signal produced by the PSTN network makes it necessary to combine the different ringing signals into a single ringing signal for initializing the modem.

In view of these difficulties, the present invention has been provided.

SUMMARY OF THE INVENTION

It is an object of this invention to provide in a personal communications device a common ringing signal to a modem from either a cellular telephone and directly connected PSTN network.

In carrying out the invention, a common ring signal is derived for the personal communications device modem. The common ring signal will provide a signal in the PSTN ring signal format to the modem in response to a ring signal received over the directly-connected PSTN network or from a cellular telephone system ring indication or a command indicating that a call has been received over the cellular network. In either case, the modem is initialized in response to the derived ring indicate signal and posts an interrupt to the personal communications system processor. The processor can then enter the cellular radio telephone data reception/ transmission mode, if the cellular radio indicates an incoming call has been received. If no cellular network call has been received, the system defaults to the PSTN network for data transmission and reception.

DESCRIPTION OF THE PREFERRED EMBODIMENT

Figure 1A:
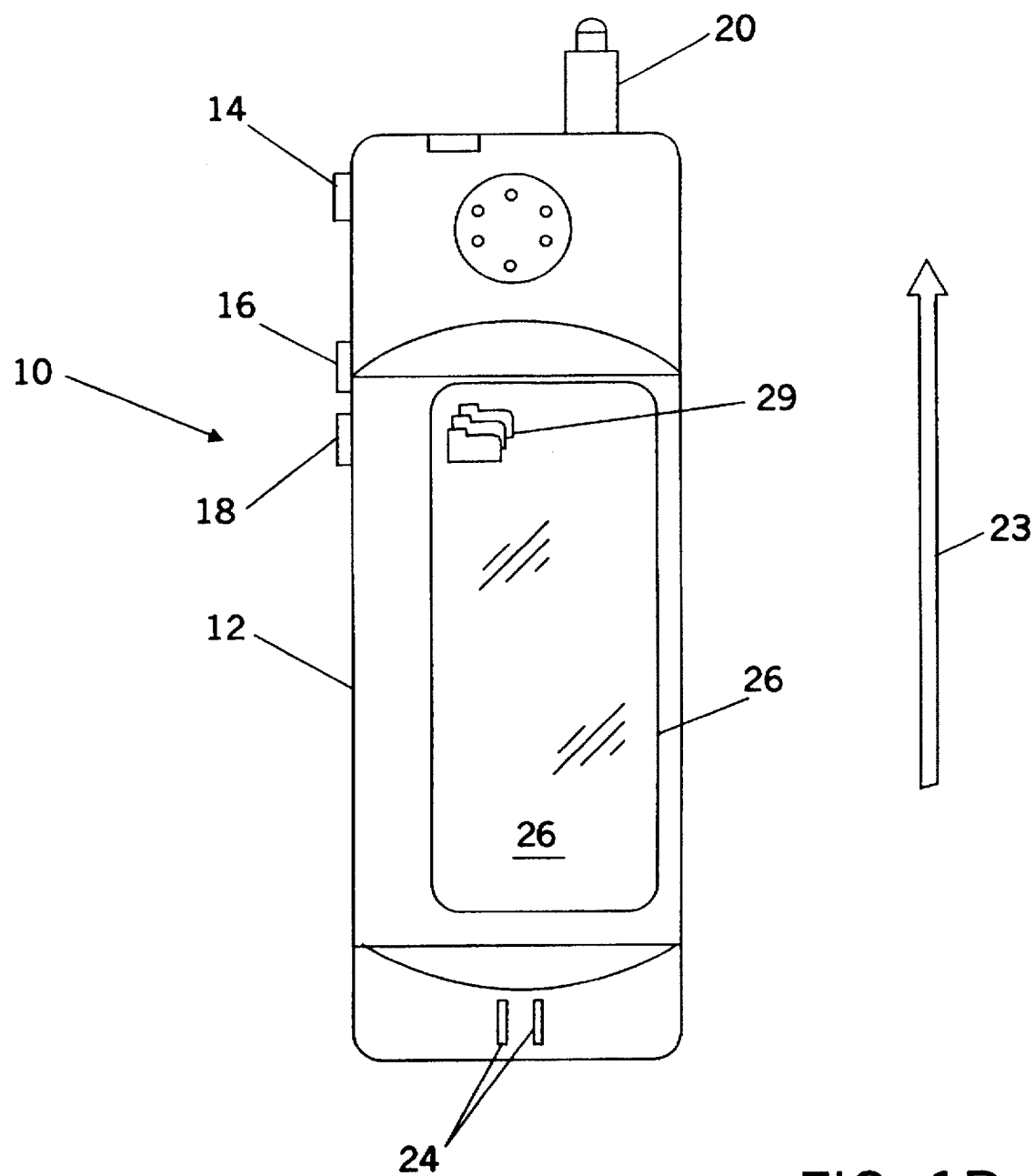
FIG. 1A is a plan view of a personal communication device employing a preferred embodiment of the present invention.

Referring now to FIG. 1, there is shown a personal communication device 10. The personal communication device includes a cellular telephone and an internal data processing system for implementing, via cellular radio, multiple data communication features, such as E-MAIL, facsimile transmission/reception, etc. The personal communicator 10 includes a housing 12 which has pushbuttons 14, 16 and 18 mounted along lateral sides thereof. Manual pushbuttons 14, 16 and 18 provide for on/off, up (increase) and down (decrease) functions.

The personal communication device 10 includes a speaker 22 and microphone 24 positioned at approximately the standard telephone handset positions. In use, the cellular telephone communicates through antenna 20 to provide normal two-way voice communication between the user and a base station connected to the PSTN network.

Input/output functions to the processor within the personal communications device 10 are effected through the touch-sensitive screen 28, and underlying touch screen display 26. The touch screen display 26 displays various menus familiar to computer users, and various selection icons. By using a small pointed stylus 23, it is possible to select among menu selections appearing on the touch screen display 26 by pressing stylus 23 against the portion of the touch-sensitive screen 28 overlaying the display 26.

The touch-sensitive overlay which identifies user selections made with the stylus 23, encodes the selection and is read by the processor resident within personal communication device 10.

Various functions such as increased volume, decreased volume, increased brightness, decreased brightness, etc. may be implemented by selecting the appropriate menu function from touch screen display 26 and then operating one of switches 16 or 18.

Figure 1B:
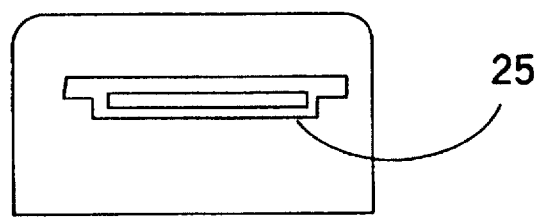
FIG. 1B is an end view of the personal communication device of FIG. 1A.

The personal communicating device of FIG. 1A also includes a standard RJ11 jack 25 as shown in FIG. 1B. The personal communication device can be directly coupled to the PSTN network through a standard telephony cable in those circumstances where cellular radio is not needed.

The protocols used in cellular radio for placing a call and answering a call are set forth in the AMPS standards. These protocol functions are carried out in a different format, suitable for RF communications different from the signalling used in the PSTN network for the same functions. The personal communication device of FIGS. 1A and 1B therefore includes interface circuitry peculiar to the cellular telephone network protocols and the PSTN network protocols so that communication through both networks is possible.

Figure 2:
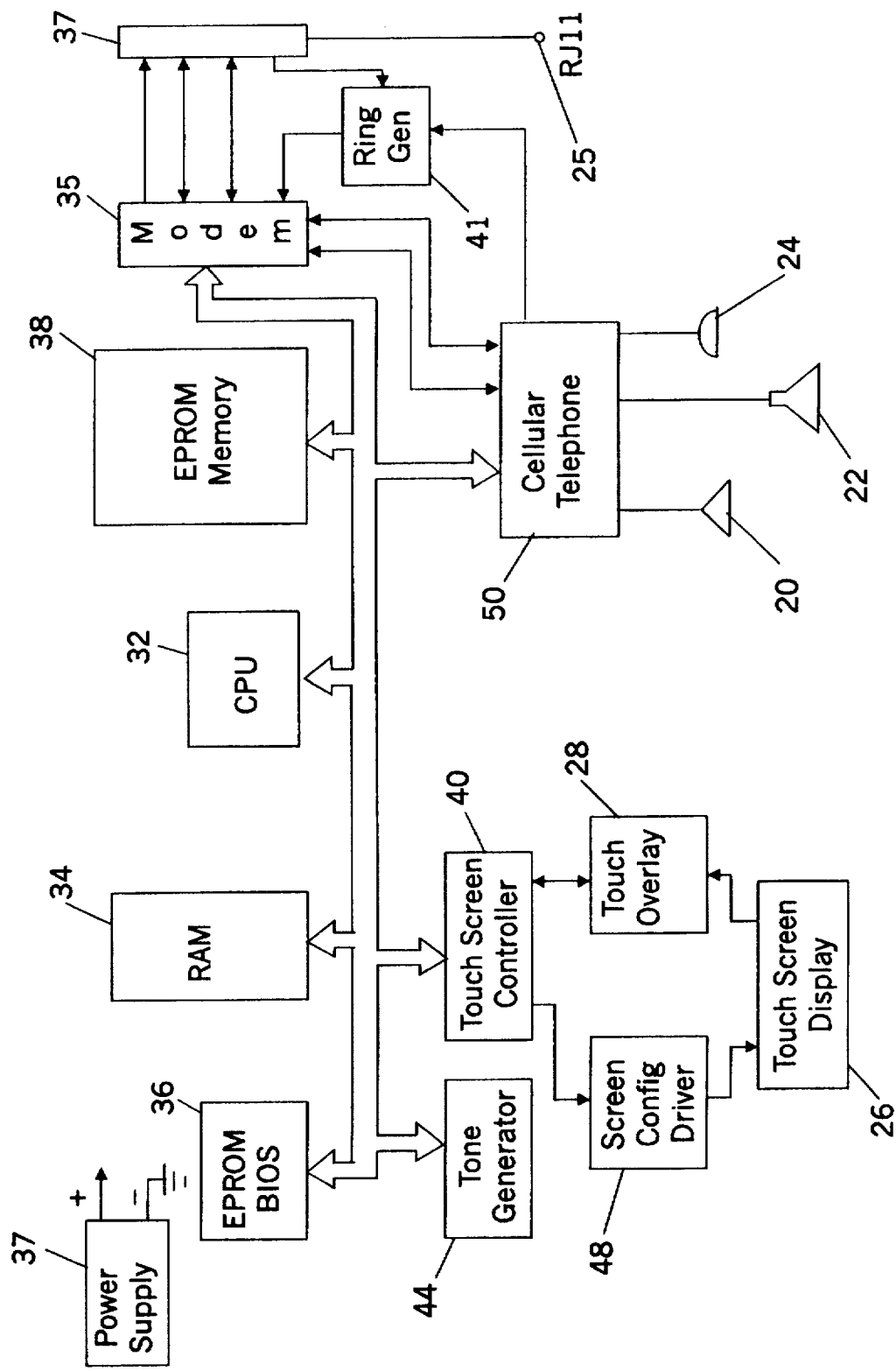
FIG. 2 is a block diagram of the device of FIGS. 1A and 1B illustrating the personal communication device of the preferred embodiment of the invention.

A block diagram of the electronic circuitry architecture for the personal communication device of FIG. 1A is shown in FIG. 2. Referring now to FIG. 2, a CPU 32 is shown which controls the display of various user menus on the touch-screen display 26, as well as provides an interface between the cellular radio 50 and modem 35.

The system of FIG. 2 operates from programming information contained in EPROM 36, EPROM 38 and RAM 34. RAM 34 stores the application programs, such as the one for the address book/auto dialer, one for placing a call over the cellular radio 50, etc. The system implementation emulates that of a PC/XT class portable computer. The CPU 32 belongs to the type of Model VG 230, commercially available from VADEM, Inc., San Jose, Calif. The CPU 32 and its companion controller include an LCD controller 40, a communications port and various power and bus connections to the bus 33.

The EPROM 36 stores the basic input/output system (BIOS), as well as a self-test program. EPROM 38 contains files for providing a navigator program, the DOS and certain application programs which produce the communication and data processing functions, as well as interrupt handling for the CPU 32. Further details relating to this architecture can be found in U.S. patent application Ser. No. 08/146,342 (Attorney Docket No. BC993-079, common assignee).

The operation of the touch-screen display 26 and touch screen overlay 28 is controlled from a touch-screen controller 40. A screen driver 48 provides the illuminating voltages and character drive signals to the touch screen display 26. The touch-sensitive screen 28 comprises an array which will sense a force applied to a particular part of the touch overlay 28 and encode the same as position information. Touch screen controller 40, via the bus 33, can provide a command identifying the location touched on the touch-sensitive screen 28 to the CPU 32. CPU 32 can then invoke the selected application program or subroutine of an application program stored in the RAM 34 for execution.

A tone generator 44 is shown which will produce an audible beep in the speaker 22 each time the screen is touched by the user using the stylus 23 and a command is successfully decoded. Thus, the user can audibly detect when his selection has been recognized.

The integrated cellular and PSTN interface is connected to the antenna 22 for transmitting and receiving to the local cellular network. The cellular telephone 50 produces a cellular ring signal indicating that an incoming call is being received by the cellular radio 50. Further, the DAA interface 39 provides a standard PSTN ring voltage from the RJ11 connector 25 tip and ring connections. A common ring generator 41 receives the ring voltage from the DAA interface 39 and cellular radio 50 and produces a single PSTN mode ring signal for modem 35.

In this way, modem 35 is initialized with a PSTN type of ring indicate signal whether the incoming call is received via cellular radio 50 or over the PSTN RJ11 jack 25. The modem 35 responds to the PSTN ring signal by posting an interrupt to the CPU 32 which invokes the routine for communicating by modem. Incoming data from either the PSTN network or cellular radio 50 is received by the modem 35 as standard modem signalling tones and processed in the usual way. Further, data is output from the modem 35 to both the cellular radio 50 and interface 39 providing communication through either medium.

The capability of providing data communication through either the RJ11 jack 25 or cellular radio 50 must take into account different formats of the cellular radio network and PSTN network. When placing a call over the cellular radio network 50, the cellular radio 50 invokes the AMPS protocol application for sending dial digits via the radio interface to a base station.

The standard for placing calls on the PSTN network uses DTMF tones corresponding to called number digits. DTMF tones are also used to access equipment connected to the called party's telephone, such as banking information, voice mail messages, etc.

The personal communication device of FIGS. 1A, 1B and 2 receives incoming calls for data services through either the cellular radio 50 or RJ11 25 connector. The two network services have different ring signal formats. The PSTN network produces a tone of a prescribed frequency and cadence as a ringing signal which is sensed by connected telephone equipment as an incoming telephone call. The ring signal signals the telephone equipment to go off hook and signal back via the tip and ring connections of the RJ11 connector 25 to begin a session with a calling party.

The cellular telephone ring signal 50 is usually a series of pulsed tones which alert the operator to the incoming phone call. As soon as the cellular telephone 50 goes off hook, a signal in accordance with the AMPS format is returned to the base station to begin a session via the cellular telephone.

Figure 3:
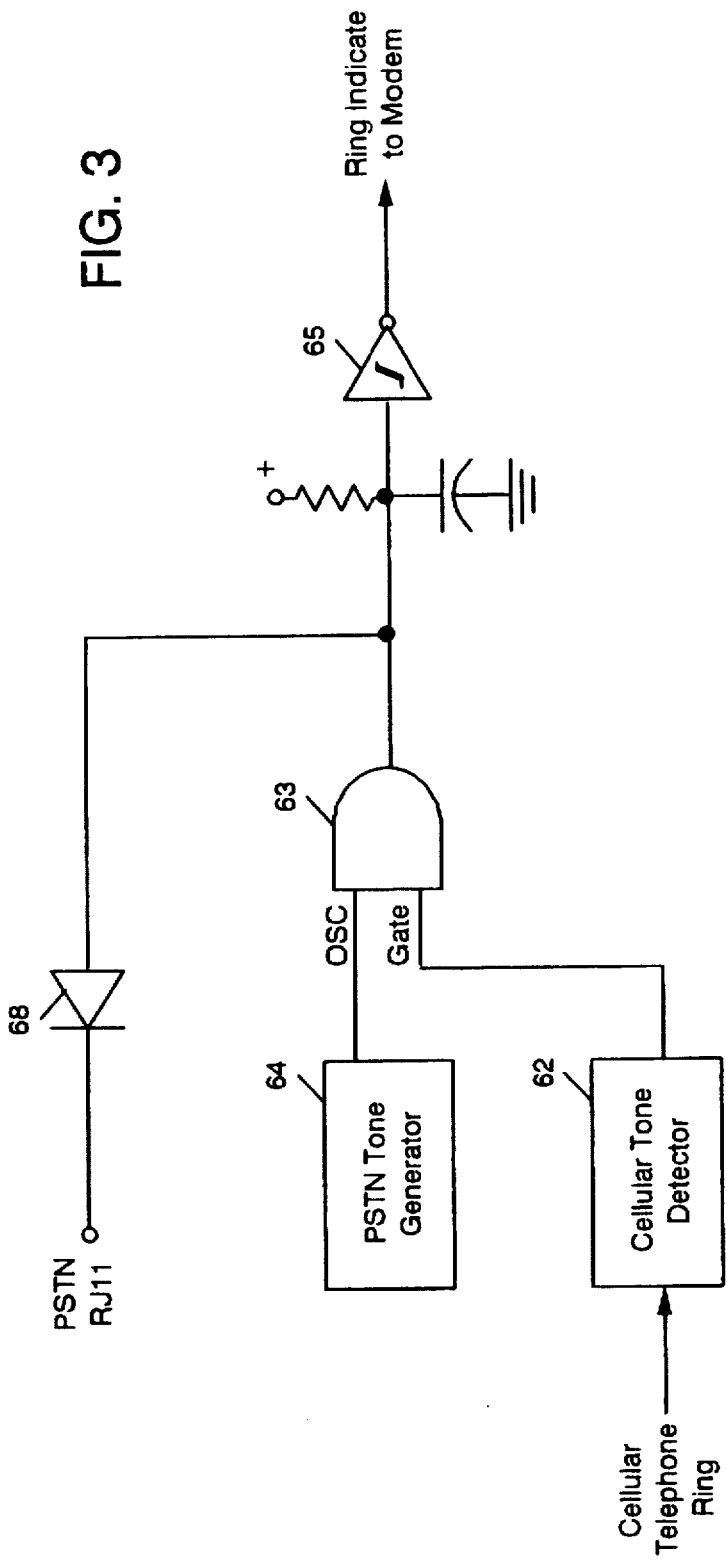
FIG. 3 illustrates a circuit for generating a common ring signal to the modem of FIG. 2 from either a PSTN ring indicate signal or a cellular telephone ring signal.

A ring generator 41 of FIG. 2 receives both the PSTN-originated ring signal and cellular telephone ring signal. The ring generator 41 is shown more completely in FIG. 3. The ring generator 41 accepts a cellular telephone ring signal which may be a series of tone pulses or it may be a digital command, depending on the configuration employed in the cellular telephone controller 50. In the current embodiment, it is assumed that the cellular system ring signal is a series of tone pulses which are detected in a tone detector 62. Tone detector 62 provides a DC output when the pulse ring signal is detected having a given amplitude and frequency.

The cellular tone detector 62 provides a signal to gate 63. A PSTN tone generator for generating pulses in the PSTN format are supplied from generator 64 to gate 63. Thus, once an incoming cellular telephone call is detected, pulses in accordance with the PSTN ring format are applied to a Schmit trigger 65. Schmit trigger 65 will produce the required PSTN ring signal for triggering modem 35 to go off hook. Modem 35, after receiving the ring signal, will initiate an INTERRUPT to CPU 32 to begin a communication session. CPU 32 has also been alerted of the incoming call from a command received from the cellular telephone 50. The combination of the modem initiated interrupt and cellular telephone initiated receive command is used by CPU 32 to initialize the system for a data service.

Modem 35 will then receive data from the cellular telephone as a sequence of tones, and decode the tones into digital data. Digital data obtained from decoding the tones are available for transfer on bus 33 to the CPU 32. CPU 32 will forward text for display on the touch screen display 26 based on the digital data.

The ring generator 41 also receives a ring signal from DAA interface 39. As is known to those skilled in the art, DAA interface 39 will present a ring signal when the ring voltage is detected on the PSTN network to the ring generator 41. As the tone and cadence of the ring signal is in the proper format for recognition by modem 35, the signal is coupled via diode 68 to the Schmidt trigger 65. Schmidt trigger inverter 25 produces sharply-defined pulses from the PSTN ring signal. The modem 35 recognizes the coupled signal and posts an INTERRUPT as in the case where cellular telephone 50 initiates a ring command. The CPU 32 is capable of determining whether or not the incoming ring signal came from a connected PSTN network through RJ11 connector 25, or via the cellular telephone network. Modem 35 in either case transfers data to the appropriate interface to engage in a data session with a calling party.

Thus, it is clear that the personal communications device of FIGS. 1A, 1B and 2 is capable of data services on either a transmit or receive mode using either cellular telephone communications or standard telephone line modem communication. Those skilled in the art will recognize yet other embodiments of the invention described more particularly by the claims which follow.

What is claimed is:

1. A ring detection device for signaling a modem adapted to respond to a PSTN ring signal in a personal communication device which alternatively communicates by radio telephone and through a direct connection to a PSTN that applies a ring signal to indicate an incoming call, said ring detection device comprising:

a detector connected to said radio telephone for detecting a signal indicating an incoming call and, responsively, producing a call detection signal;

an oscillator circuit for generating a simulated ring signal;

a gate circuit connected to receive the call detection signal from said detector and the simulated ring signal from said oscillator and passing such ring signal to output only in response to a call detection signal;

coupling means for receiving ring signals from said PSTN network and as output from said gate circuit and applying them to said modem to signal an incoming call whereby said modem is prepared to respond to the call.

2. The ring detection device of claim 1 wherein said coupling means comprises a Schmidt trigger circuit connected to receive the output of said gate circuit and coupled by a diode to said PSTN network, said Schmidt trigger circuit passing signals from said gate circuit and said diode to said modem.

3. The ring detection device of claim 1, wherein said radio telephone presents a pulsed sinusoidal voltage to indicate an incoming call and said detector includes a filter for selectively passing said pulsed sinusoidal voltage.

4. The ring detection device of claim 1, wherein said coupling means converts each received ring signal to a level shifted ring signal.

* * * * *